United States Patent
Gertlowski et al.

(10) Patent No.: US 9,598,198 B2
(45) Date of Patent: Mar. 21, 2017

(54) ROTARY TABLE MACHINE FOR CONTAINER TREATMENT WITH ROTARY TRANSDUCER

(71) Applicant: KRONES AG, Neutraubling (DE)

(72) Inventors: Georg Gertlowski, Schierling (DE); Uwe Hasler, Regensburg (DE); Helmut Schneider, Regensburg (DE); Jörg Triebel, Alteglofsheim (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/775,202

(22) PCT Filed: Jan. 24, 2014

(86) PCT No.: PCT/EP2014/051364
§ 371 (c)(1),
(2) Date: Sep. 11, 2015

(87) PCT Pub. No.: WO2014/154378
PCT Pub. Date: Oct. 2, 2014

(65) Prior Publication Data
US 2016/0031581 A1 Feb. 4, 2016

(30) Foreign Application Priority Data
Mar. 27, 2013 (DE) .......... 10 2013 205 398

(51) Int. Cl.
*B65G 29/00* (2006.01)
*B65G 47/84* (2006.01)
(Continued)

(52) U.S. Cl.
CPC ............ *B65C 9/04* (2013.01); *B65C 9/06* (2013.01); *B65C 9/40* (2013.01); *G01D 5/244* (2013.01); *G01D 5/04* (2013.01)

(58) Field of Classification Search
CPC .................. B65G 47/244; B65G 47/846
(Continued)

(56) References Cited

U.S. PATENT DOCUMENTS 4,629,528 A * 12/1986 Tanaka .............. B26D 5/32
156/351
5,259,913 A 11/1993 Stover
(Continued)

FOREIGN PATENT DOCUMENTS

DE 69411178 T2 10/1998
DE 69629203 T2 4/2004
(Continued)

OTHER PUBLICATIONS

International Search Report for Application No. PCT/EP2014/051364, mailed Apr. 9, 2014.
(Continued)

*Primary Examiner* — Douglas Hess
(74) *Attorney, Agent, or Firm* — Marshall, Gerstein & Borun LLP

(57) ABSTRACT

Disclosed is a rotary table machine for container treatment, comprising a carousel with container receptacles for conveying containers, wherein the container receptacles are arranged at a regular spacing along a circular path about an axis of rotation of the carousel by means of a machine pitch, characterized in that the carousel and a rotary transducer are connected via a transmission such that, when the carousel rotates about a machine pitch, the rotary transducer emits and/or processes a whole-number multiple of a periodic value increment as a position signal, a signal transmitter is designed to detect a reference mark on the carousel and for emitting a reference mark signal on the basis thereof, and a signal processing device is designed to process the position signal and the reference mark signal in order to regulate the (Continued)

position of the carousel and to control the container receptacles.

16 Claims, 3 Drawing Sheets

(51) Int. Cl.
    *G01D 5/00* (2006.01)
    *B65C 9/04* (2006.01)
    *B65C 9/40* (2006.01)
    *G01D 5/244* (2006.01)
    *B65C 9/06* (2006.01)
    *G01D 5/04* (2006.01)

(58) Field of Classification Search
    USPC ...... 198/340, 341.05, 377.02, 377.06, 469.1, 198/474.1
    See application file for complete search history.

(56) References Cited

U.S. PATENT DOCUMENTS

| | | | |
|---|---|---|---|
| 5,538,575 A * | 7/1996 | Hinton | B65C 9/1819 118/259 |
| 5,748,422 A * | 5/1998 | Heaston | H02H 3/202 361/101 |
| 6,016,040 A * | 1/2000 | Hoffmann | F02D 41/2096 310/317 |
| 6,428,639 B1 * | 8/2002 | Oldenburg | B65C 3/08 156/351 |
| 6,752,189 B2 * | 6/2004 | Oldenburg | B65C 3/08 156/361 |
| 7,581,635 B2 * | 9/2009 | Lecomte | B65G 33/02 198/459.2 |
| 8,181,769 B2 * | 5/2012 | Hishiya | H01L 21/67303 198/474.1 |
| 8,651,853 B2 * | 2/2014 | Dupuis | B29C 49/421 198/459.8 |
| 9,302,856 B2 * | 4/2016 | Papsdorf | B65G 29/00 |

FOREIGN PATENT DOCUMENTS

| | | |
|---|---|---|
| DE | 60015376 T2 | 5/2005 |
| DE | 102004055745 A1 | 6/2006 |
| DE | 20221787 U1 | 9/2007 |
| DE | 102008054238 A1 | 5/2010 |
| DE | 102011003061 A1 | 7/2012 |
| EP | 1864910 A1 | 12/2007 |
| WO | WO-01/05590 A1 | 1/2001 |
| WO | WO-2011/045818 A1 | 4/2011 |

OTHER PUBLICATIONS

German Search Report for Application No. 102013205398.3, dated Oct. 22, 2013.

* cited by examiner

ROTARY TABLE MACHINE FOR CONTAINER TREATMENT WITH ROTARY TRANSDUCER

CROSS-REFERENCE TO RELATED APPLICATION

The present application is the US national phase of International Patent Application No. PCT/EP2014/051364, filed Jan. 24, 2014, which application claims priority to German Application No. 102013205398.3, filed Mar. 27, 2013. The priority application, DE 02013205398.3, is hereby incorporated by reference.

FIELD OF THE DISCLOSURE

The invention relates to a rotary table machine for container treatment, and a method for a rotary table machine.

BACKGROUND

Rotary table machines for container treatment are usually designed as stretch-blow molding machine, rinser, filler, closer, inspection machine, labeling machine and/or printing machine for containers. The containers, for example bottles or cans, are received in a carousel in container receptacles and transported by them. To achieve high precision in the treatment, the position of the container receptacles must be determined with high precision during the rotation of the carousel.

The container receptacles are arranged at a regular spacing on the carousel along a circular path about the axis of rotation by means of a machine pitch. For example in a labeling machine, about 70 container receptacles are arranged at the carousel in which the containers are received and which are, in addition to the rotation of the carousel, pivoting about their own axis by means of a servomotor. Thereby, each container may be pivoted relative to a labeling unit such that the label may be applied to the complete container circumference. For a precise positioning of the label, the position of the carousel and thus that of the container receptacles relative to the labeling unit must be exactly known.

DE 69411 178 T2 discloses a carousel with container receptacles and a shaft, wherein a motor with a driving gearwheel engages a central gearwheel at the shaft. Moreover, the rotary transducer is additionally driven via the central gearwheel by which then the position of the carousel may be determined.

DE 10 2004 055 745 A1 also discloses a rotary table machine with a carousel and a shaft, the rotary transducer being here centrally arranged at the shaft.

In such rotary table machines it showed that the container treatment, such as for example the labeling, is insufficiently precise.

SUMMARY OF THE DISCLOSURE

It is the object of the invention to provide a rotary table machine that permits a more precise container treatment.

The invention solves this object in a rotary table machine for container treatment with the features of the characterizing part according to which the carousel and a rotary transducer are connected via a transmission such that, when the carousel rotates about a machine pitch, the rotary transducer emits and/or processes a whole-number multiple of a periodic value increment as a position signal, a signal transmitter is designed to detect a reference mark on the carousel and to emit a reference mark signal on the basis thereof, and a signal processing device is designed to process the position signal and the reference mark signal in order to regulate the position of the carousel and to control the container receptacles.

By the carousel and the rotary transducer being connected via a transmission such that, when the carousel rotates about a machine pitch, the rotary transducer emits and/or processes a whole-number multiple of a periodic value increment as a position signal, when the carousel rotates about the machine pitch, a sequence with a whole-number multiple of the periodic value increment is emitted as the position signal. For example, these may be 5000 periods of the value increment. When the carousel rotates further about the machine pitch, the same sequence of periodic value increments is emitted. In an arrangement of, for example, 60 container receptacles along the circular path, one machine pitch is exactly 6°. Within this machine pitch, the position of the container receptacles may then be resolved with 0.0012° at 5000 value increments per machine pitch. In other words, the transmission ratio permits a particularly high resolution of the position of the carousel.

By the signal transmitter being designed to detect a reference mark at the carousel and to emit a reference mark signal on the basis thereof, the reference mark or a corresponding reference container receptacle may be determined as the zero position of the carousel. As a consequence, due to the regular distance of the container receptacles, it may be determined at which position each individual container receptacle is located at the carousel. Thereby, for example each individual container receptacle may be exactly correlated with a treatment station, and the pivot of the container receptacles may be activated corresponding to their positions.

By the signal processing device being designed to process the position signal and the reference mark signal in order to regulate the position of the carousel and to control the container receptacles, both the position of the carousel and the movement of the container receptacles are regulated or controlled based on these signals. Thereby, variations between the carousel's rotation and the determination of the position of the container receptacles are avoided. Correspondingly, a high precision of container treatment is achieved.

The rotary table machine for container treatment may be arranged in a beverage processing plant. The rotary table machine may be a stretch-blow, cleaning, labeling, inspection, filling or closing machine for containers. The containers may be bottles, cans, cups or the like. The container receptacles may be designed to rotate about their own axis. A control cam or servomotors may be designed to rotate the container receptacles about their own axes. The container receptacles may comprise clamping elements to stably receive the containers therein.

The machine pitch may be 360° divided by the number of container receptacles at the carousel. For example, the machine pitch is 6° in case of 60 container receptacles along the circular path.

The axis of rotation of the carousel may extend perpendicularly through the center of the carousel. The carousel may include a shaft along the axis of rotation. The axis of rotation of the carousel may extend vertically. The shaft of the carousel may be mounted in frame elements by a bearing. The carousel may be connected to a motor to drive it.

The rotary transducer may be an optical, inductive or magnetic rotary transducer. The inductive rotary transducer may be designed as tachogenerator or resolver. The rotary transducer may emit, per revolution, a whole-number multiple of the periodic value increments as a pulse train as a position signal. The position signal may be a periodic square wave signal or sinusoidal signal. As an alternative, the rotary transducer may be designed to process the position signal and emit it as a position value. The emission of the position value may be accomplished via a data bus. The rotary transducer may be an absolute value rotary transducer (SSI rotary transducer) or an incremental rotary transducer.

The reference mark may be arranged at an outer periphery of the carousel. The reference mark may comprise a magnet or an optical mark. The signal transmitter may comprise a magnetic switch or a photocell for detecting the reference mark.

The signal processing device may comprise a microprocessor, digital inputs and/or outputs, analogue inputs and/or outputs which are optionally designed to read the position signal and/or the reference mark signal.

The signal processing device may be connected with the motor for driving the carousel and/or with servomotors for pivoting the container receptacles. The signal processing device may comprise a regulation loop to regulate the position of the carousel based on the position signal. The signal processing device may be designed to control the container receptacles depending on the position signal. The signal processing device may be designed to regulate the servomotors of the container receptacles with a regulation loop on the basis of pivoting angles of the container receptacles. The container receptacles or the servomotors may comprise rotary transducers to detect the pivoting angles.

The signal processing device may be designed to process the position signal in order to control a unit for container treatment. Thereby, with the position signal and the reference mark signal, the unit may be additionally controlled and the precision of the container treatment increased. The unit may be a filling station, a labeling unit, an inspection unit and/or a closing head. For example, in a labeling unit, labeling may be particularly well synchronized with the rotation of the carousel based on the position signal and the reference mark signal as for all drives the same time base applies. The signal processing device and the unit may be connected with a control line.

A zero point of the position signal may be freely selectable. Thereby, in a commissioning or maintenance process, a defined position of the carousel may be stored in the rotary table machine. The zero point may be stored in the rotary transducer or in the signal processing device. Edges of the position signal may be selected as zero point.

The transmission may comprise a reduction ratio such that, when the carousel rotates about a machine pitch, a shaft of the rotary transducer rotates by one, two or four revolutions, or by half a revolution or a quarter revolution. Thereby, it may be particularly easily ensured that in a rotation of the carousel about a machine pitch, the position signal passes over a whole-number multiple of the periodic value increment.

The transmission may comprise a sprocket belt with rounded teeth. Thereby, a particularly quiet running of the rotary transducer is achieved since the rounded teeth can engage a gearwheel particularly smoothly. The transmission may comprise at least two gearwheels which are connected via the sprocket belt, the gearwheels having the same or different diameters. The gearwheels may have teeth corresponding to the sprocket belt. The sprocket belt may have tooth profiles which are arranged diagonally with respect to the running direction of the sprocket belt. Thereby, the teeth may engage the gearwheels even more easily. The sprocket belt may consist of a plastic material. The tension of the sprocket belt may be applied with a tension roller.

The transmission may comprise a motor control gear which is coupled to a motor at a driving end for introducing a driving force, and which is arranged at a driven end between the rotary transducer and the carousel. Thereby, the forces and torques between the motor control gear and the carousel may be particularly well decoupled from the rotary transducer. This ensures a particularly quiet running of the rotary transducer. The motor control gear may comprise two driven ends, the first driven end being connected to the carousel via at least two gearwheels and the second driven end being coupled to the rotary transducer via at least two other gearwheels. The two driven ends may be the two ends of one shaft.

The sprocket belt may be arranged between the motor control gear and the rotary transducer. Thereby, the sprocket belt is particularly well decoupled from the driving forces and the rotary transducer may operate particularly precisely. The sprocket belt may engage a gearwheel at the driven end of the motor control gear and a further gearwheel at the rotary transducer.

The rotary transducer may be designed to emit and/or process a coarse signal whose period corresponds to a whole-number multiple of the periodic value increments. Thereby, interferences in the position signal may be particularly well detected.

A period of the coarse signal may correspond to one machine pitch. Thereby, only on the basis of the position signal and the coarse signal, an absolute position value may be determined within the machine pitch. The rising or falling signal edges of the coarse signal may correspond to reference positions of the container receptacles.

A zero point of the coarse signal may be freely selectable. Thereby, the coarse signal may be particularly easily calibrated relative to the actual positions of the container receptacles in the rotary table machine. The zero point of the coarse signal may be stored in the rotary transducer or in the signal processing device.

The signal processing device may be designed to define a time slot around the reference mark detected by the signal transmitter and identify a signal edge of the coarse signal within the time slot as a zero position of the carousel. Thereby, the absolute position of the carousel may be particularly precisely detected since the signal edge of the coarse signal serves as the zero position which is more precise than the reference mark detected by the signal transmitter. For the zero position, the carousel may be rotatable to a predetermined reference position. Thereby, the carousel may be particularly easily calibrated in the rotary table machine during installation and/or service works.

A safety rotary transducer may be designed to detect a safe speed of the carousel, the safety rotary transducer being optionally integrated with the rotary transducer. Safety rotary transducer can mean that the rotary transducer is a SIL rotary transducer according to the EN 61508 standard. Thereby, the speed of the carousel may be monitored independent of the correct function of the rotary transducer, and in case of a deviation from an expected speed, the rotary table machine may be stopped and/or an alarm may be triggered. Thereby, the rotary table machine may be particularly well protected. The fact that the safety rotary transducer is integrated with the rotary transducer can mean that the safety rotary transducer is embodied as an additional independent evaluation unit of the rotary transducer. As an alternative, this can mean that the safety rotary transducer and the rotary transducer are connected by a common shaft. The rotary transducer may comprise an electrical connection for emitting the position signal and/or the coarse signal, and the safety rotary transducer may comprise a separate electrical connection for emitting a speed signal.

Moreover, the invention provides a method for a rotary table machine for container treatment, wherein containers are transported in container receptacles which are arranged at a regular spacing along a circular path about an axis of rotation of the carousel by means of a machine pitch, and a rotary transducer emits and/or processes a position signal with periodic value increments for determining the position of the carousel, characterized in that a transmission transmits the machine pitch of the carousel to a whole-number multiple of the periodic value increments of the rotary transducer, a signal transmitter detects a reference mark at the carousel and emits a reference mark on the basis thereof, and a signal processing device processes the position signal and the reference mark signal in order to regulate the position of the carousel and to control the container receptacles.

By both the position of the carousel and the container receptacles being regulated or controlled on the basis of the position signal and the reference mark signal, the rotation of the carousel and the movement of the container receptacles are synchronized based on the position signal and the reference mark signal. Moreover, by the transmission ratio, a particularly high resolution of the machine pitch is ensured by the periodic value increments of the rotary transducer. Thereby, the position signal is a signal with particularly high resolution. Moreover, with the aid of the reference mark at the carousel, the signal transmitter may detect an absolute position of the carousel, and the absolute position of each container receptacle may be determined. Correspondingly, the movement of each container receptacle may be controlled depending on its current position along the circular path.

The above described embodiments or parts thereof, may be combined with the following embodiments.

The rotary transducer may emit a coarse signal whose signal edges correspond to reference positions of the container receptacles. Thereby, the position of the container receptacles may be particularly precisely determined at the reference positions.

Within a time slot around the reference mark detected by the signal transmitter, a signal edge of the coarse signal may be identified as zero position of the carousel. Thereby, a particularly precise zero position of the carousel may be determined.

BRIEF DESCRIPTION OF THE SEVERAL VIEWS OF THE DRAWINGS

Features and advantages of the invention will be illustrated below with reference to the embodiments represented in the figures. In the figures.

DETAILED DESCRIPTION OF THE PREFERRED EMBODIMENTS

Figure 1:
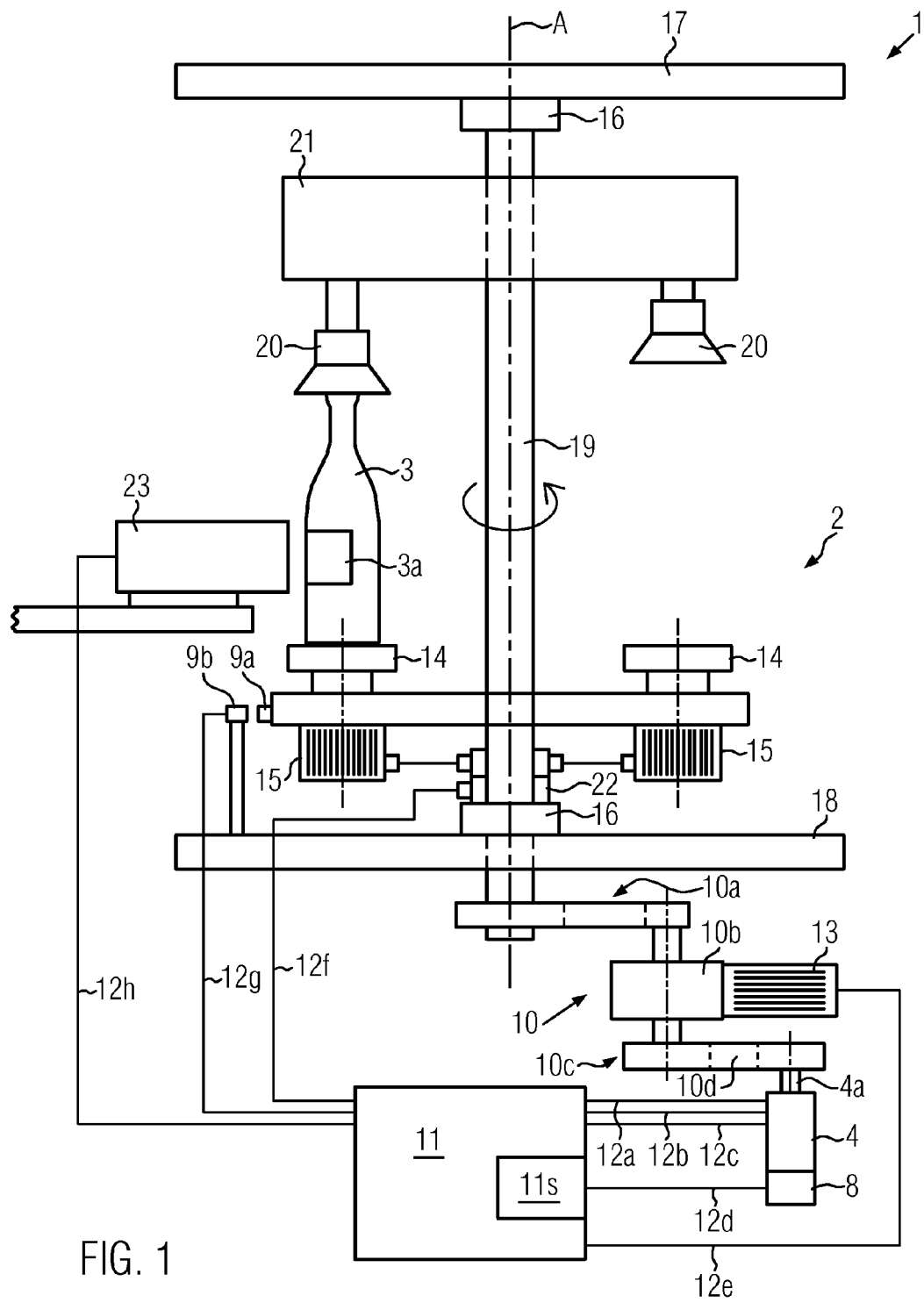
FIG. 1 shows a lateral representation of a rotary table machine.

FIG. 1 shows a rotary table machine 1 in a lateral representation. One can see a carousel 2 that is designed with rotary tables and at the circumference of which the container receptacles 14 are arranged. The container receptacles are moved by the servomotors 15. The carousel 2 comprises a shaft 19 which is rotatably mounted at both ends with the bearings 16 at the upper and lower frame elements 17 and 18, respectively. With each container receptacle 14, one container 3 each may be stably received and pivoted by the servomotors 15. The containers 3 are secured against shifting at the upper end via the fixing elements 20. The fixing elements 20 are movably mounted in the head plate 21 and connected to the shaft 19. When the carousel 2 is rotating, each fixing element 20 corresponds to the corresponding container receptacle 14.

The motor 13 is provided as the drive of the carousel 2. Here, the motor control gear 10b reduces the speed of the motor 13 to a lower speed on the driven end of the motor control gear 10b. The driven end of the motor control gear 10b is connected to the shaft 19 of the carousel 2 via the first partial transmission 10a. The first partial transmission 10a further reduces the speed of the driven end of the motor control gear 10b. The first partial transmission 10a comprises a first gearwheel at the driven end of the motor control gear 10b, a gearwheel which is larger compared to this at the shaft 19 of the carousel 2, and a sprocket belt which connects both gearwheels. As an alternative, the two gearwheels may also engage directly.

One can moreover see that the containers 3 are provided with labels 3a by the labeling unit 23. For a high precision in labeling, a precise positioning of the containers 3 relative to the labeling unit 23 is required. This will be described below:

For a precise determination of the position, the carousel 2 and the rotary transducer 4 are connected by the transmission 10. The transmission 10 comprises the above described first partial transmission 10a, the motor control gear 10b and the second partial transmission 10c connected at the second driven end. The second partial transmission 10c comprises a first gearwheel which is connected to the second driven end of the motor control gear 10b, a second gearwheel which is connected to the shaft 4a of the rotary transducer 4, and a sprocket belt 10d which connects both of them. The second partial transmission 10c may be embodied with or without transmission ratio. The first partial transmission 10a, the motor control gear 10b, and the second partial transmission 10c together have one transmission ratio, so that one machine pitch of the carousel 2 corresponds to a complete rotation of the shaft 4a at the rotary transducer 4. The rotary transducer 4 is here embodied as optical rotary transducer which emits, per revolution of the shaft 4a, exactly 5000 periods of a periodic value increment as position signal. Consequently, one rotation of the carousel 2 about one machine pitch exactly corresponds to 5000 periodic value increments of the rotary transducer 4. Thereby, a particularly high resolution of the movement of the carousel 2 is possible. The rotary transducer 4 emits the position signal to the signal processing device 11 at the electric line 12a as a square wave signal. As an alternative, it may also be a sinusoidal signal.

Moreover, the rotary transducer 4 is designed to emit a coarse signal, wherein one period of the coarse signal corresponds to a complete revolution of the axis of rotation 4a of the rotary transducer. The coarse signal is also a square wave signal which is here emitted at the electric line 12b. One first half period exactly corresponds to one half revolution of the rotary transducer 4 or 2500 value increments, respectively. The second half period of the coarse signal corresponds to the second half rotation of the rotary transducer 4 or to further 2500 value increments of the position signal, respectively.

The line 12c is moreover shown for the power supply of the rotary transducer 4.

A safety rotary transducer 4 is shown to be integrated with the rotary transducer 4. It detects a safe speed of the carousel 2 and emits it at a separate line 12d. By this, the rotation of the carousel 2 may be monitored. This is done here by the monitoring device 11, which compares the safe speed with an expected speed. In case of a difference, the rotary table machine 1 will be stopped and an alarm will be triggered.

Moreover, the signal transmitter 9b is shown which detects the reference mark 9a at the carousel 2. The reference mark 9a is here embodied as a magnet which is detected with a magnetic switch in the signal transmitter 9b. As soon as the reference mark 9a is opposite the signal transmitter 9b, the latter emits a voltage pulse as signal via the line 12g.

The above described signals are detected by the signal processing device 11. The latter is embodied with a micro processor and digital inputs for detecting the signals at lines 12a, 12b, and 12g. In the process, the signals are processed with the signal processing device 11, as will be described below with reference to FIG. 3, in order to calculate an absolute position of the carousel 2 with high resolution. With this absolute position of the carousel 2, the motor 13 for driving the carousel 2, the servomotors 15 for moving the container receptacles 14, and the labeling unit 23 are then regulated or controlled, respectively. Since these three units are controlled or regulated on the basis of a common time base, i. e. the absolute position of the carousel 2, a particularly precise labeling of the containers 3 with the labels 3a is possible.

The activation of the motor 13 is done via the lines 12e with a pulse-width control. The labeling unit 23 comprises a separate control device which is exactly triggered in terms of time via the line 12h. Moreover, the servomotors 15 are connected to the signal processing device 11 via the rotary distributor 22 and the line 12f. Here, the signal processing device 11 comprises a regulation loop for each servomotor 15 which in turn comprise separate rotary transducers (not represented here) for the exact regulation of the pivot of the container receptacles 14.

Figure 2:
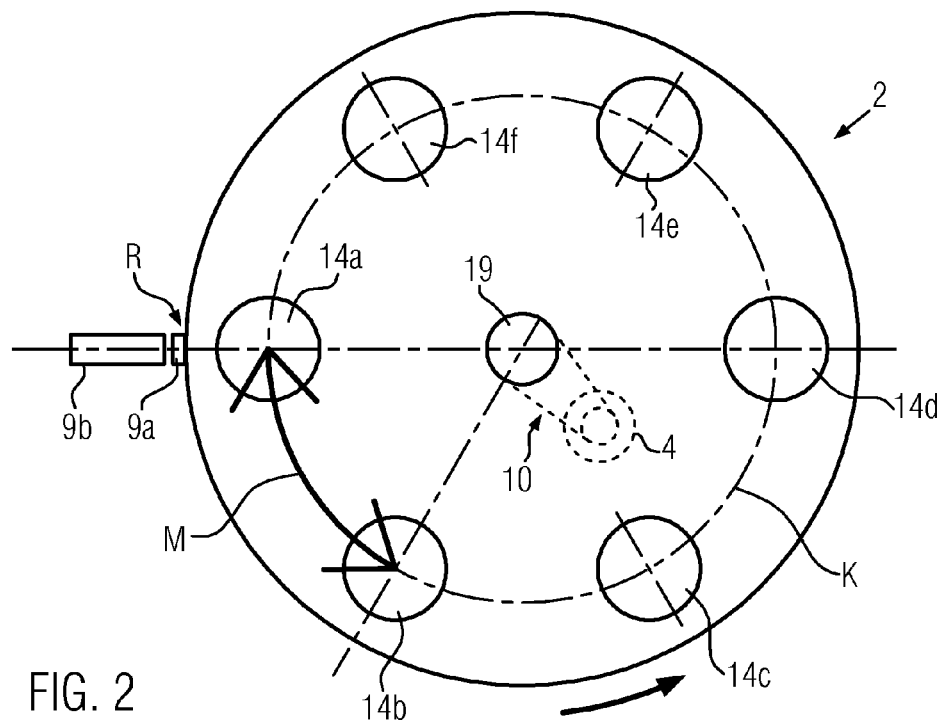
FIG. 2 shows a schematic plan view of the rotary table machine of FIG. 1.

In FIG. 2, one can see the rotary table machine 1 of FIG. 1 in a plan view. One can see here the carousel 2 which comprises six container receptacles 14a-14f. These are arranged at regular distances along the circular path K, and consequently, one machine pitch M exactly corresponds to 60°. One can also see the zero position R of the carousel 2, where here the reference mark 9a is exactly opposite the signal transmitter 9b. For this zero position R, the container receptacles 14a-14f are at the positions 0°, 60°, 120°, 180°, 240° and 360. The rotational positions of each container receptacle 14a-14f with respect to the position of the carousel 2 may be stored as curves in the signal processing device 11, where with each curve, the rotational position of a certain container receptacle 14a-14f is correlated with the position of the carousel 2.

One can moreover see that the shaft 19 of the carousel 2 is connected to the rotary transducer 4 via the transmission 10 (only schematically shown here).

Figure 3:
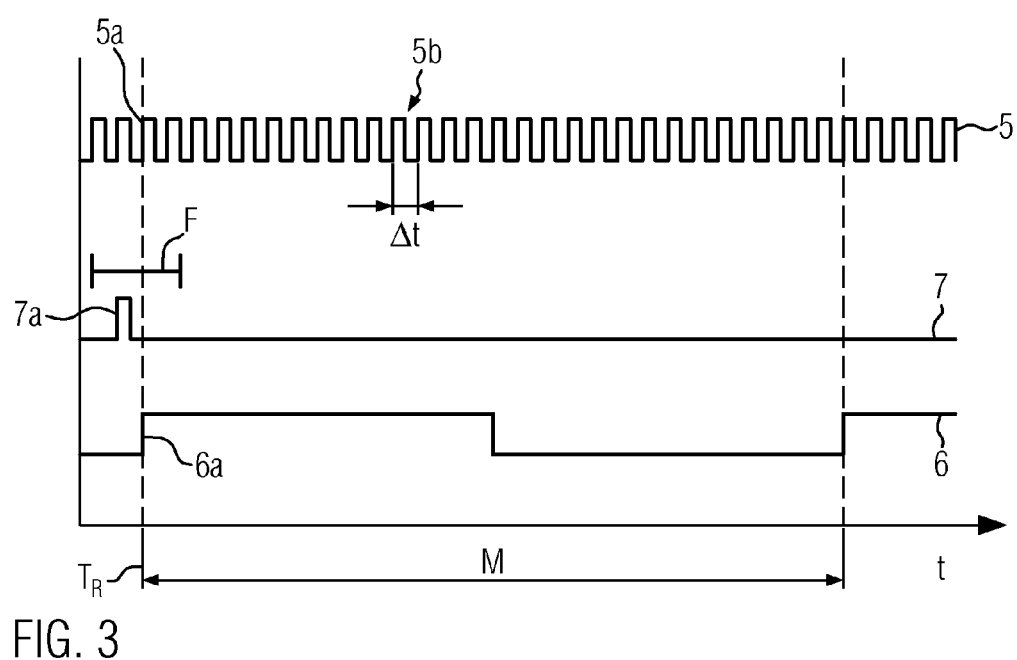
FIG. 3 shows a schematic signal representation of the position signal, the reference mark signal, and the coarse signal within a machine pitch.

FIG. 3 shows, in a schematic representation, the position signal 5, the reference mark signal 7, and the coarse signal 6 as time characteristic over time t within a machine pitch M.

One can see that the coarse signal 6 is a square wave signal which exactly passes through one period within one machine pitch M as of the reference point in time $T_R$. Moreover, the reference point in time $T_R$ corresponds to the zero position R of the carousel 2 shown in FIG. 2. The zero point of the coarse signal 6 is the positive signal edge 6a and is selected such that it corresponds to the zero position of the carousel 2 (see FIG. 2).

The position signal 5 is here also a square wave signal, but it can alternatively also be a sinusoidal signal. Here, the position signal 5 passes exactly through 5000 periods during one machine pitch M. These may also be, corresponding to the design of the rotary table machine, 2000, 1000, 500, 100 or 10 periods. The number of periods of the position signal 5 is here only shown schematically to better show the correlation of the individual signals. One can see that the position signal 5 comprises the periodic value increments 5b which exactly pass through one period during the period At. One can also see that the zero point of the position signal 5 is the signal edge 5a and selected such that it corresponds to the zero position R of the carousel 2 (see FIG. 2). Correspondingly, the positive signal edge 5a of the position signal 5 is exactly at the reference point in time $T_R$. One can also see that one period of the coarse signal 6 corresponds to one whole-number multiple of the periodic value increments 5b of the position signal 5.

Moreover, the reference mark signal 7 is shown which is emitted by the signal transmitter 9b when at the zero position R, the reference mark 9a is opposite the signal transmitter 9b. Here, the signal transmitter 9b is particularly simply designed with a magnetic switch, wherein by production tolerances, the signal pulse 7a of the reference mark signal 7 comes within the slot F. If now the reference mark signal 7 would be taken directly for an absolute position signal of the carousel 2, the actual position of the carousel 2 within the slot f would be known relatively inexactly. Correspondingly, the rising signal edge 6a of the coarse signal 6 is identified as zero position R of the carousel 2 within the slot F with the signal processing device. Subsequently, the absolute position signal for the carousel 2 is formed of the coarse signal 6 and the position signal 5, for example by integration of the value increments 5b as of the reference point in time $T_R$. Hereby, on the one hand the passage of the container receptacle 14a is detected, and simultaneously a particularly exact absolute position of the carousel 2 is determined.

By the particularly exact position signal 5 detected with high-resolution, and by the absolute position of the carousel 2 determined in connection with the coarse signal 6 and the reference mark signal 7, the rotation of the carousel 2, the pivot of the container receptacles 14, and the labeling unit 23 may be regulated or controlled particularly exactly and with a particularly high resolution since it is done based on a common time base.

Figure 4:
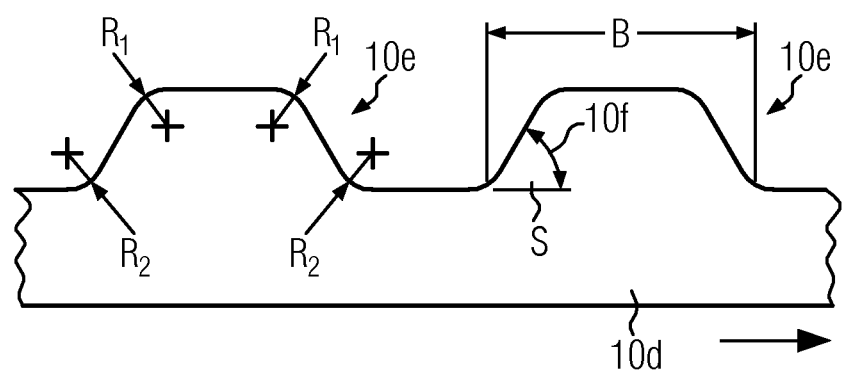
FIG. 4 shows a sectional view of a sprocket belt for the rotary table machine of FIG. 1.

In FIG. 4, the sprocket belt 10d of the rotary table machine 1 of FIGS. 1 and 2 is shown in a sectional view. One can see that the sprocket belt 10d has rounded teeth 10e.

Each tooth 10e has rounded radii R1, R2 by which the sprocket belt 10d more easily engages the corresponding gearwheels of the partial transmission 10c (not represented here). The radii R1, R2 are smaller than half the width B of each tooth. Optionally, the radii R1, R2, are smaller than one quarter of the width of the tooth 10e. Moreover, one can see that the lateral edges 10f of the teeth 10e include an inclination 10f which is inclined with the angle S with respect to the running direction (indicated by the arrow). The angle S is here within a range of 60 degrees to 90 degrees, optionally within a range of 70 degrees-80 degrees. Thereby, the teeth 10e may engage the corresponding gearwheels of the partial transmission 10c even more easily.

With the rotary table machine 1 shown in FIGS. 1-4, the methods corresponding to claims 13-15 may be carried out.

It will be understood that features mentioned in the above described embodiments are not restricted to these special combinations and are also possible in any other combinations.

What is claimed is:

1. A rotary table machine for container treatment, comprising a carousel with container receptacles for conveying containers, wherein the container receptacles are arranged at a regular spacing along a circular path about an axis of rotation of the carousel by means of a machine pitch,
    the carousel and a rotary transducer being connected via a transmission such that, when the carousel rotates about a machine pitch, the rotary transducer at least one of emits or processes a whole-number multiple of a periodic value increment as a position signal,
    a signal transmitter and a reference mark adapted to indicate a zero rotary position of the carousel, wherein the signal transmitter is operable to detect the reference mark on the carousel and to emit a reference mark signal on the basis thereof, and
    a signal processing device operable to process the position signal and the reference mark signal in order to regulate the position of the carousel and control the container receptacles.

2. The rotary table machine according to claim 1, wherein the signal processing device is operable to process the position signal in order to control a unit for container treatment.

3. The rotary table machine according to claim 1, wherein a zero point of the position signal is freely selectable.

4. The rotary table machine according to claim 1, wherein the transmission has such a reduction ratio that, when the carousel rotates about a machine pitch, a shaft of the rotary transducer rotates about one of a group comprising one, two, four revolutions, about half a revolution, and a quarter revolution.

5. The rotary table machine according to claim 1, wherein the transmission comprises a sprocket belt with rounded teeth.

6. The rotary table machine according to claim 5, wherein the sprocket belt is arranged between the motor control gear and the rotary transducer.

7. The rotary table machine according to claim 1, wherein the transmission comprises a motor control gear which is coupled, at a driving end, with a motor for introducing a driving force, and which is arranged, at a driven end, between the rotary transducer and the carousel.

8. The rotary table machine according to claim 1, wherein the rotary transducer is designed to at least one of emit or process a coarse signal whose period corresponds to a whole-number multiple of the periodic value increments.

9. The rotary table machine according to claim 8, wherein a period of the coarse signal corresponds to one machine pitch.

10. The rotary table machine according to claim 8, wherein a zero point of the coarse signal is freely selectable.

11. The rotary table machine according to claim 8, wherein the signal processing device is operable to define a time slot around the reference mark detected by the signal transmitter and to identify, within the time slot, a signal edge of the coarse signal as the zero rotary position of the carousel.

12. The rotary table machine according to claim 1, wherein a safety rotary transducer is operable to detect a safe speed of the carousel.

13. A method for a rotary table machine for container treatment, wherein containers are transported in container receptacles which are arranged at a regular spacing along a circular path about an axis of rotation of the carousel by means of a machine pitch, and a rotary transducer for determining the position of the carousel processes and/or emits a position signal with periodic value increments, a transmission translates the machine pitch of the carousel into a whole-number multiple of the periodic value increments of the rotary transducer,
    a signal transmitter and a reference mark adapted to indicate a zero rotary position of the carousel, wherein the signal transmitter detects the reference mark at the carousel and emits a reference mark signal on the basis thereof, and
    a signal processing device processes the position signal and the reference mark signal to regulate the position of the carousel and control the container receptacles.

14. A method according to claim 13, the rotary transducer emitting a coarse signal whose signal edges correspond to reference positions of the container receptacles.

15. A method according to claim 14, within a time slot around the reference mark detected by the signal transmitter, identifying a signal edge of the coarse signal as the zero position of the carousel.

16. A rotary table machine for container treatment, comprising a carousel with container receptacles for conveying containers, wherein the container receptacles are arranged at a regular spacing along a circular path about an axis of rotation of the carousel by means of a machine pitch,
    the carousel and a rotary transducer being connected via a transmission such that, when the carousel rotates about a machine pitch, the rotary transducer at least one of emits or processes a whole-number multiple of a periodic value increment as a position signal,
    a signal transmitter operable to detect a reference mark on the carousel and to emit a reference mark signal on the basis thereof,
    a signal processing device operable to process the position signal and the reference mark signal in order to regulate the position of the carousel and control the container receptacles, and
    a safety rotary transducer operable to detect a safe speed of the carousel.

* * * * *